(12) United States Patent
Ropp

(10) Patent No.: US 6,200,032 B1
(45) Date of Patent: Mar. 13, 2001

(54) SEAT SUSPENSION WITH DUAL ROLLER ASSEMBLY

(75) Inventor: Dale Ropp, Buda, IL (US)

(73) Assignee: Sears Manufacturing Co., Davenport, IA (US)

( * ) Notice: Subject to any disclaimer, the term of this patent is extended or adjusted under 35 U.S.C. 154(b) by 0 days.

(21) Appl. No.: 09/352,665

(22) Filed: Jul. 9, 1999

(51) Int. Cl.[7] ................................................. F16C 29/04
(52) U.S. Cl. ............................................... 384/58; 384/47
(58) Field of Search ................................ 384/34, 47, 50, 384/53, 55, 57, 58, 59, 19; 267/131; 248/564, 588, 421, 575; 297/344.16

(56) References Cited

U.S. PATENT DOCUMENTS

| | | | |
|---|---|---|---|
| 3,265,450 | * | 8/1966 | Aho .................................... 384/57 |
| 3,441,322 | * | 4/1969 | Leschinger ........................... 384/47 |
| 3,661,431 | * | 5/1972 | Wisecarver ........................... 384/55 |
| 3,873,055 | * | 3/1975 | White ................................. 248/564 |
| 4,390,216 | * | 6/1983 | Mueller et al. ........................ 384/54 |
| 4,856,763 | * | 8/1989 | Brodersen et al. .................. 267/131 |
| 5,125,631 | * | 6/1992 | Brodersen et al. .................. 267/131 |
| 5,468,070 | * | 11/1995 | Riedel et al. ....................... 384/127 |

\* cited by examiner

*Primary Examiner*—Thomas R. Hannon
(74) *Attorney, Agent, or Firm*—Niro, Scavone, Haller & Niro

(57) ABSTRACT

A roller and guide assembly for use in an actuating seat suspension having a roller assembly comprised of a first and second roller that articulate on upper and lower guide surfaces formed by a channel. The first roller rotatingly engages the lower guide surface and the contact between the first roller and guides surface permits the roller to move horizontally along the guide surface while preventing the downward movement of the roller assembly. The second roller rotatingly engages the upper guide surface an the contact between the roller and guide surface permits the roller to move horizontally along the guide surface while preventing the upward movement of the roller assembly.

5 Claims, 2 Drawing Sheets

SEAT SUSPENSION WITH DUAL ROLLER ASSEMBLY

BACKGROUND OF THE INVENTION

The invention relates to an improved seat suspension assembly using a roller assembly and a channel or guide as part of the suspension system. Typically, seat suspensions use roller assemblies attached to shafts and that are adapted to travel in metal channels or guides having opposing guide surfaces on which the rollers cycle back and forth. In addition, the guides often act to limit the perpendicular movement of the roller with respect to the guide by positioning the guide surfaces in close proximity to the upper and lower most points on a roller. However, several competing design considerations play a role in the position of the guide surfaces with respect to the rollers.

First, any tolerance between the rollers and guides creates unwanted play in the suspension which results in undesirable movement in the seat. A reduced or zero tolerance, on the other hand, may result in a force which resists the movement of the roller in the guide as the suspension actuates. This results in friction that may unnecessarily wear the rollers and other components, and if the force is great enough, it may result in converting the rollers into slider blocks or even preventing the movement of the rollers altogether. Thus, there is a need in seat suspensions in which a press-fit like relationship between a roller and guide may be achieved to eliminate unwanted play without the attendant problems associated which sandwiching a roller between two opposingly located guide surfaces.

SUMMARY OF THE INVENTION

The present invention provides a roller and guide assembly which allows a press-fit relationship between the roller assembly and guide without the attendant problems previously mentioned. The present invention provides a seat suspension having a roller assembly comprised of first and second rollers which rotate in opposite directions and in which the first roller engages one of the guide surfaces and the second roller engages the other guide surface. This arrangement creates a suspension in which the rollers are allowed to freely rotate in either direction and in which the force which might otherwise oppose the direction of travel of the assembly is eliminated—even when a press-fit between the roller assembly and guide is used.

It is therefore an object of the present invention to provide a seat suspension assembly in which a close tolerance or press-fit between a roller assembly and guide may be used in the suspension.

Another object of the present invention is to provide a seat suspension which reduces unwanted movement in the suspension by eliminating play between the rollers and the guide surfaces.

It is another object of the present invention to provide a seat suspension in which component wear is reduced.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENTS

Set forth below is a description of what are currently believed to be the preferred embodiments or best examples of the invention claimed. Future and present alternatives and modifications to the preferred embodiments are contemplated. Any alternates or modifications in which insubstantial changes in function, in purpose, in structure or in result are intended to be covered by the claims of this patent.

Figure 1:
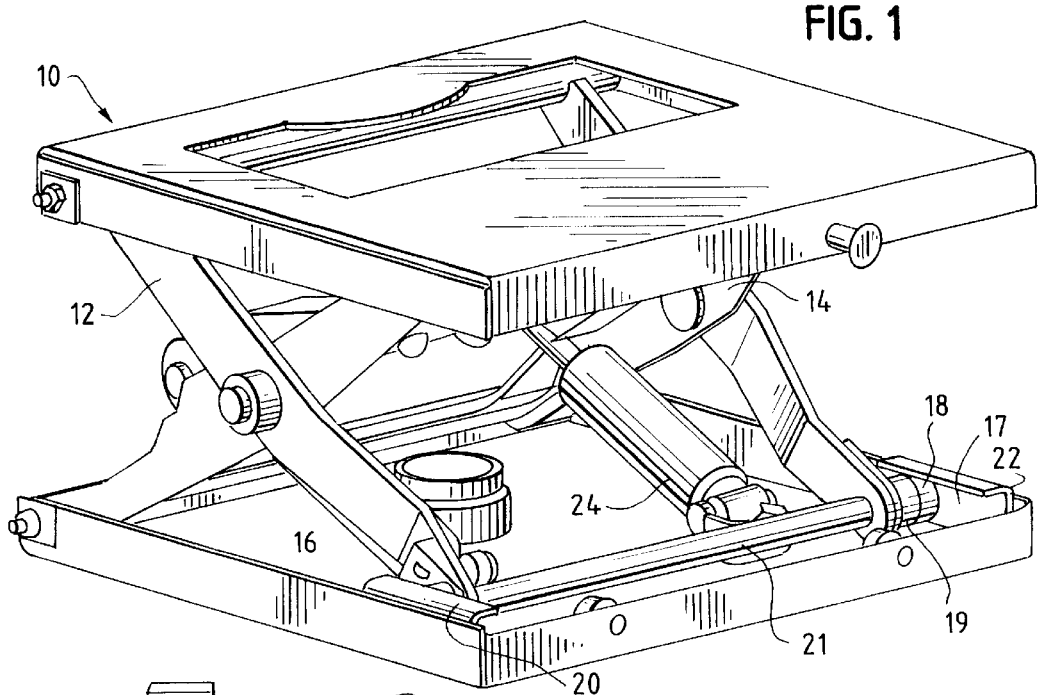
FIG. 1 is a perspective view of a typical seat suspension using one embodiment of the present invention.

As shown in FIG. 1, the present invention may be used in a seat suspension 10 having parallel pairs of scissor arms 12 and 14 which are in turn connected to a shock absorber 24. The scissor arms are also attached to opposingly located roller assemblies 16 and 17 which travel in channels or guides 20 and 22 which are attached to base 23 and form part of the shock absorbing system of the suspension. Typical examples of some of the different types of mechanical seat suspensions in which the present invention may be used are shown and described in U.S. Pat. Nos. 4,856,763 and 5,125,631, which are incorporated herein by reference. Of course, the present invention is not limited to use in scissor-type seat suspensions but also may be used in other types of seat suspensions in which rollers and guides are used as part of the suspension system. One type of roller that may be used with the present invention is of the design described and shown in U.S. Pat. No. 5,468,070, which is incorporated herein by reference.

Figure 2:
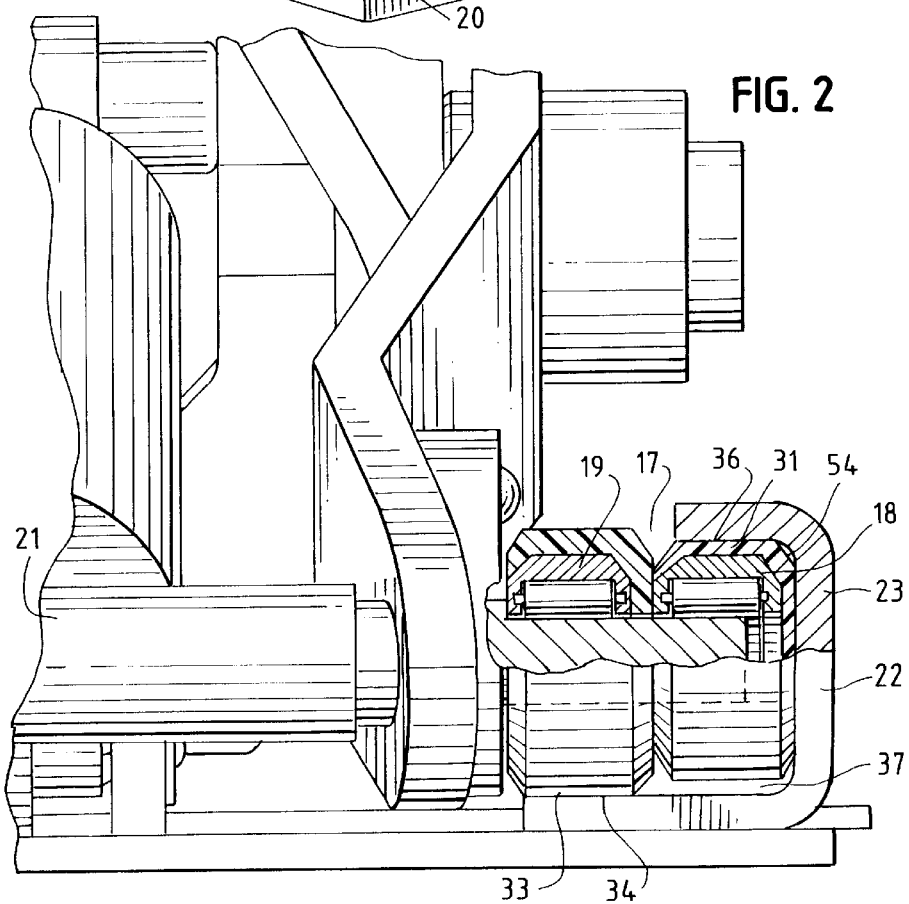
FIG. 2 is an explode front view of the embodiment shown in FIG. 1 with portions removed to reveal aspects of the present invention.

As shown in FIGS. 1 and 2, roller assembly 17 includes first roller 18 and second roller 19 both of which are coaxially attached to shaft 21, which is part of the seat suspension. Roller 18 has an engagement surface 31 which is in rolling engagement with guide surface 36 of guide 22.

Roller 19 is a separate roller from roller 18 and rotates freely with respect to roller 18. As with roller 18, it is axially aligned on shaft 21 in a fixed position with respect to roller 18. Roller 19 also has an engagement surface 33 which is in rolling engagement with guide surfaces 34 of guide 22. The same design and construction may also be used for any other roller assembly and guide used in the seat suspension such as roller assembly 16 and guide 20.

As is also shown, no clearance is necessary between the roller engagement surfaces 31 and 33 and guide surfaces 34 and 36. Alternatively, a press-fit may also be used in which there is a slight compressive force between the rollers and guide surfaces. In addition, for ease of manufacture, guide 22 may be in the shape of a channel as shown in FIGS. 1, 2, 3, and 5. Alternatively, other guides employing two opposingly located guide surfaces may be used as well such as the staggered guide shown in FIG. 4.

Figure 3:
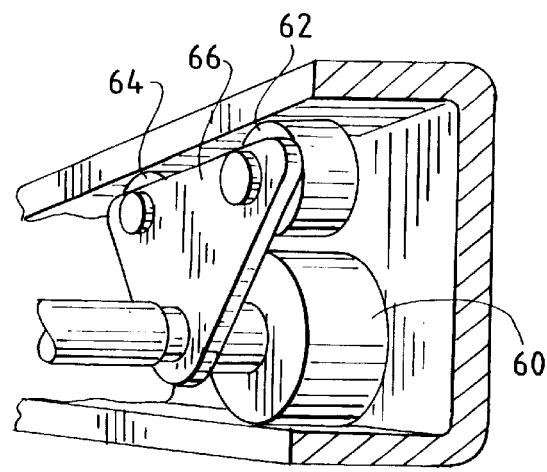
FIG. 3 is a perspective view of a second embodiment on the invention.

As is further shown in FIGS. 1–3, the roller which engages the lower most guide surface may be of a larger diameter than the other roller since this roller will be the load bearing roller. Moreover, having rollers with two different diameters, and in which the inner most roller is the larger of the two rollers, allows a channel-like guide to be used. As shown in FIG. 2, roller 19 is the larger of the two rollers and it engages guide 22 at guide surface 34. Because roller 18 is also attached to shaft 21, and as a result of its smaller diameter, its lower most point fails to extend down to guide surface 34 thus forming a gap 37. This, in turn, prevents roller 18 from engaging guide surface 34. As is further shown, contact between roller 19 and guide surface 36 is prevented by terminating guide 22 prior to its reaching roller 19.

Figure 6:
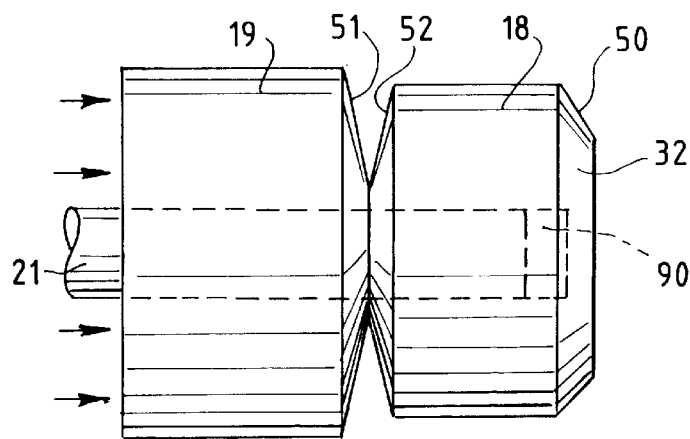
FIG. 6 is a fragmentary cross-sectional view of a roller assembly with a shaft disposed therein.

As shown in FIG. 6, rollers 18 and 19 may include sloped surfaces 50–52. Surfaces 51 and 52 assist in reducing roller to roller friction. Surface 50 prevents corner 54 of guide 22 from interfering with the operation of roller 18.

Moreover, as is also shown in FIG. 6, shaft 21 is disposed inside roller 19 and terminates at a point that is spaced from vertical wall 32 to form space or gap 90. Space 90 permits the axial adjustment of the roller without interference from shaft 21.

In use, a press-fit or zero clearance between the roller engagement surfaces and guide surfaces may be used. This may be done without interference since each roller only engages one of the guide surfaces resulting in rollers which freely rotate in opposite directions with respect to each other as the suspension actuates and the rollers cycle back and forth in the guides. Moreover, the uninhibited rotation produced by the singular engagement eliminates the forces which oppose the roller assembly's direction of travel. This, in turn, permits unwanted perpendicular movement to be eliminated since a constant engagement between each roller and its respective guide surface may be maintained.

Figure 4:
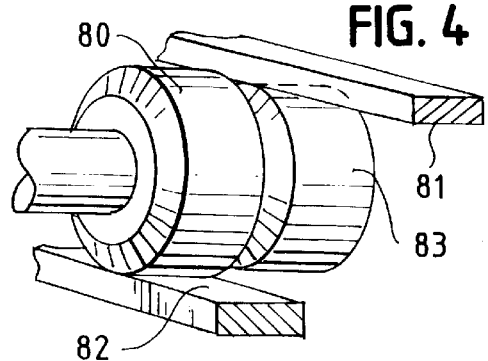
FIG. 4 shows a perspective of a third embodiment of the present invention.
Figure 5:
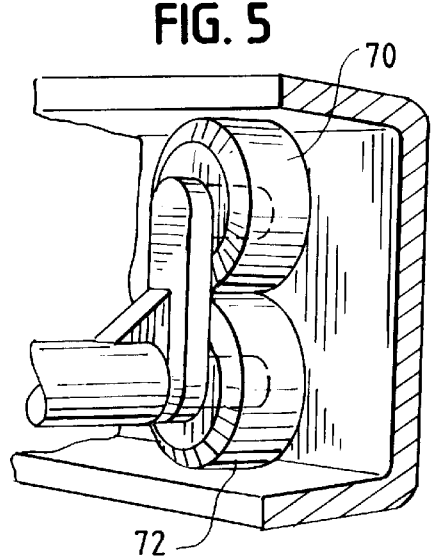
FIG. 5 is a perspective view of a fourth embodiment of the present invention.

While the embodiment shown in FIGS. 1 and 2 uses a guide in the shape of a channel and rollers which are coaxially disposed, other configurations may be used as well with the invention to achieve the same functional advantages. For example, as shown in FIGS. 3 and 5, the rollers may be located in a fixed position above one another. FIG. 3 shows a single lower roller 60 and two opposingly located upper rollers 62 and 64 which are located above roller 60 on bracket 66 located on axial 68. Similarly, as shown in FIG. 5, two opposingly located rollers 70 and 72 may be used even though the rolling surfaces of the rollers engage one another. FIG. 4 further shows rollers 80 and 83 having the same diameter and a guide that is not in the shape of a channel. As shown, a number of configurations may be used for the guide so long as two separate roller engaging guide surfaces 81 and 82 are provided.

It should be understood that various changes and modifications to the preferred embodiments described would be apparent to those skilled in the art. Changes and modifications can be made without departing from the spirit and scope of the present invention and without diminishing its intended advantages. It is, therefore, intended that such changes and modifications be covered by the following claims.

What is claimed is:

1. A roller and guide assembly for use in an actuating seat suspension system comprising:

a roller assembly having an axle on which a first and second roller are coaxially aligned with said second roller being located on a distal end of said axle;

said first roller is larger in diameter than said second roller and said first roller is a load bearing roller;

a guide assembly having a channel having upper and lower guide surfaces, said upper guide surface has a length that is less than the length of said lower guide surface;

said first roller rotatingly engages said lower guide surface, said engagement permits said roller to move horizontally along said guide surface while preventing the downward movement of said roller assembly; and said second roller rotatingly engages said upper guide surface, said engagement permits said roller to move horizontally along said guide surface while preventing the upward movement of said roller assembly.

2. The device of claim 1 wherein said first roller counter-rotates with respect to said second roller as said rollers move horizontally along said guide surfaces.

3. The device of claim 1 wherein said rollers form a press-fit with said guide surfaces.

4. The apparatus of claim 1 wherein said second roller includes an inner bore which terminates in a vertical wall and said axle is located in said bore with said axle terminating at a point before the vertical wall of said second roller to form a gap.

5. A roller and guide assembly for use in an actuating seat suspension system comprising:

a roller assembly having an axle on which a first and second roller are coaxially aligned with said second roller being located on a distal end of said axle;

said first roller is larger in diameter than said second roller and said first roller is a load bearing roller;

a guide assembly having a channel having upper and lower guide surfaces, said upper guide surface has a length that is less than the length of said lower guide surface;

said first roller rotatingly engages said lower guide surface, said engagement permits said roller to move horizontally along said guide surface while preventing the downward movement of said roller assembly;

said second roller rotatingly engages said upper guide surface, said engagement permits said roller to move horizontally along said guide surface while preventing the upward movement of said roller assembly; and said second roller includes an inner bore which terminates in a vertical wall and said axle is located in said bore with said axle terminating at a point before the vertical wall of said second roller to form a gap.

* * * * *